(12) United States Patent
Marino et al.

(10) Patent No.: US 7,871,251 B2
(45) Date of Patent: Jan. 18, 2011

(54) HIGH-PRESSURE PUMP FOR FEEDING FUEL TO AN INTERNAL COMBUSTION ENGINE

(75) Inventors: Giuseppe Marino, Bari (IT); Alessandro De Luca, Bari-palese (IT); Vittorio Caroli, Bari (IT); Angela Cavallo, Grottaglie (IT); Rocco Guarino, Turi (IT); Nicola Loiudice, Altamura (IT); Massimiliano Roncone, Bitritto (IT); Giuseppe Ficarella, Bari (IT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/096,525

(22) PCT Filed: Jan. 17, 2007

(86) PCT No.: PCT/EP2007/050431
§ 371 (c)(1),
(2), (4) Date: Jun. 6, 2008

(87) PCT Pub. No.: WO2007/088106
PCT Pub. Date: Aug. 9, 2007

(65) Prior Publication Data
US 2008/0292473 A1 Nov. 27, 2008

(30) Foreign Application Priority Data
Jan. 31, 2006 (EP) ................... 06425046
Jul. 7, 2006 (EP) ................... 06425472

(51) Int. Cl.
*F04B 53/22* (2006.01)
*F01L 3/10* (2006.01)
*F16K 21/00* (2006.01)
*F16K 15/04* (2006.01)

(52) U.S. Cl. ............... 417/454; 137/539; 251/337
(58) Field of Classification Search ............... 417/454, 417/559, 545, 549, 552, 554; 251/337; 137/315.33, 137/530, 535, 536, 539, 540; 267/166
See application file for complete search history.

(56) References Cited

U.S. PATENT DOCUMENTS

| | | | | | |
|---|---|---|---|---|---|
| 1,351,780 | A | * | 9/1920 | Mead | 251/353 |
| 2,601,563 | A | * | 6/1952 | Selwyn | 137/540 |
| 2,699,179 | A | * | 1/1955 | Hansen et al. | 137/539 |
| 3,809,122 | A | * | 5/1974 | Berg | 137/614.06 |
| 3,811,801 | A | * | 5/1974 | Buse et al. | 417/454 |

(Continued)

FOREIGN PATENT DOCUMENTS

DE 296 04 196 U1 4/1997

(Continued)

*Primary Examiner*—Devon C Kramer
*Assistant Examiner*—Bryan Lettman
(74) *Attorney, Agent, or Firm*—Ronald E. Greigg

(57) ABSTRACT

A high-pressure pump for feeding fuel to an internal combustion engine has a pump housing; a fuel delivery duct; and a check valve, which is arranged along the delivery duct, and comprises a fuel chamber; a valve member mobile within the fuel chamber; and a biasing and guiding assembly, which has a fastening member suitable for being fastened to the pump housing and sealing the fuel chamber in a fluid-tight manner; a helical spring suitable for biasing the valve member; and a bushing arranged about the helical spring in order to prevent bending of the helical spring.

17 Claims, 3 Drawing Sheets

U.S. PATENT DOCUMENTS

| | | | |
|---|---|---|---|
| 4,077,619 A * | 3/1978 | Borlinghaus | 267/166.1 |
| 4,265,271 A * | 5/1981 | Rosaen et al. | 137/540 |
| 4,466,779 A | 8/1984 | Nixon | |
| 5,203,546 A * | 4/1993 | Amadore | 267/168 |
| 5,271,312 A * | 12/1993 | Lishness et al. | 89/196 |
| 5,772,191 A * | 6/1998 | Nakano et al. | 267/289 |
| 6,213,566 B1 * | 4/2001 | Diaz | 303/9.75 |
| 6,244,295 B1 * | 6/2001 | Bartussek et al. | 137/540 |
| 6,332,761 B1 | 12/2001 | Guentert et al. | |
| 6,481,702 B1 * | 11/2002 | Fader et al. | 267/220 |
| 6,520,756 B1 | 2/2003 | Alaze | |
| 6,889,662 B2 * | 5/2005 | Hess | 123/467 |
| 7,311,118 B2 * | 12/2007 | Doutt | 137/539.5 |
| 2005/0079082 A1 | 4/2005 | Olivieri et al. | |
| 2005/0126638 A1 * | 6/2005 | Gilbert | 137/539 |
| 2005/0178434 A1 * | 8/2005 | Yang | 137/218 |

FOREIGN PATENT DOCUMENTS

| | | |
|---|---|---|
| DE | 199 27 197 A1 | 12/2000 |
| EP | 0 268 520 A2 | 5/1988 |
| GB | 1180214 | 2/1970 |
| WO | WO 03/038270 A1 | 5/2003 |

* cited by examiner

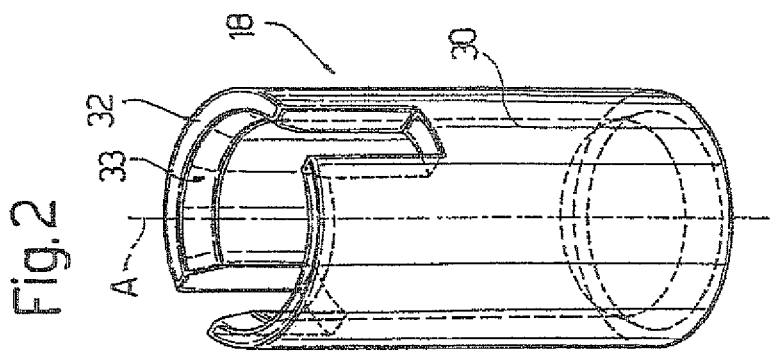
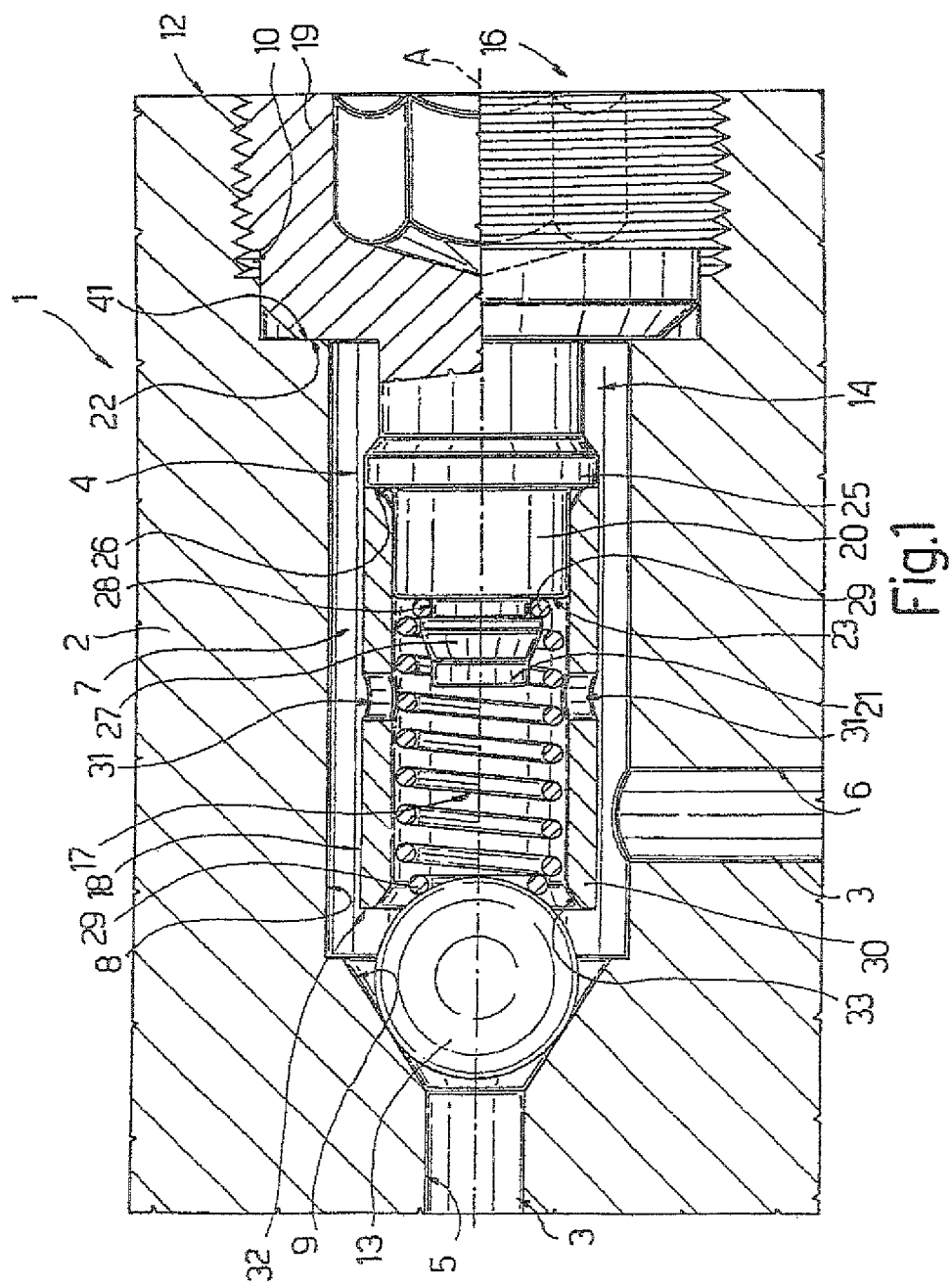

HIGH-PRESSURE PUMP FOR FEEDING FUEL TO AN INTERNAL COMBUSTION ENGINE

CROSS-REFERENCE TO RELATED APPLICATION

This application is a 35 USC 371 application of PCT/EP 2007/050431 filed on Jan. 17, 2007.

BACKGROUND OF THE INVENTION

1. Field of the Invention

The present invention relates to a high-pressure pump for feeding fuel to an internal combustion engine, and more particularly to such a high-pressure piston pump for feeding fuel to a common rail of an internal combustion engine.

2. Description of the Prior Art

A piston pump of the type with which this invention is concerned generally comprises a pump housing in which a fuel feeding duct, at least one cylinder connected to the feeding duct and one delivery duct are made. The piston pump comprises a reciprocating mobile piston within the cylinder and a check valve, which allows the fuel flow when the pressure in the cylinder reaches a level capable of exerting a force on the valve element or ball higher than the sum of the force exerted by the fuel pressure within the delivery duct downstream of the check valve and of the force of opposing spring acting on the valve element.

Generally, the check valve used in this type of high-pressure pumps extends along a given axis, is arranged along the delivery duct and comprises a seat; a mobile valve element within the seat; and a biasing and guiding assembly, which comprises a fastening member suitable to be fastened to the pump housing and to close the seat in fluid-tight manner, and a helical compression spring adapted to exert a closing bias on the valve element.

The different functional needs thus require the valve element to be made of harder material than the spring, which in turn is made of harder material than the fastening member. If to this fact it is added that the helical spring, when compressed, is subjected to axial bending or deflection, which, in turn, produces rotations of the spring about its longitudinal axis, it results that the spring wearing the fastening member and the ball wearing the spring. The higher the fuel flow rates, the higher and more marked the wear phenomena, that determine, in time, dimensional variations and incorrect pump operation.

Regarding this, it is relevant to observe that common rail systems are increasingly installed in commercial vehicles (in trucks, off-highway vehicles) because also this type of engine must respect anti-pollution provisions. The high power of commercial vehicles entails that the fuel pumps must be capable of managing high flow rates which are the main cause of bending in the helical spring-valve system.

OBJECTS AND ADVANTAGES OF THE INVENTION

It is the object of the present invention to make a high-pressure pump for feeding fuel to an internal combustion engine which is free from the drawbacks of the known art with particular reference to the operation of the check valve at flow rates higher than 200 l/h and pressure up to 2200 bars.

According to the present invention, there is provided a high-pressure pump for feeding fuel to an internal combustion engine; the pump being characterised in that the biasing and guiding assembly comprises a bushing arranged about the helical spring to prevent bending of the helical spring.

According to the present invention, by preventing bending, the bushing considerably reduces the tendency of the spring to rotate and therefore the wear of the parts in contact.

According to a preferred embodiment of the present invention, the fastening member, the helical spring and the bushing are assembled together so as to form a biasing and guiding assembly before inserting the biasing and guiding assembly in the seat. This possibility considerably facilitates valve assembly.

According to another preferred embodiment of the present invention the bushing and the fastening member form a single body so that the number of parts of the pump is not increased.

BRIEF DESCRIPTION OF THE DRAWINGS

For a better understanding of the present invention, preferred embodiments thereof will be described herein below with reference to the accompanying drawings, in which:

FIG. 1 is a sectional view with parts removed for clarity of a piston pump according to a first embodiment of the present invention;

FIG. 2 is a perspective view of a detail of the pump in FIG. 1;

DESCRIPTION OF THE PREFERRED EMBODIMENTS

Figure 4:
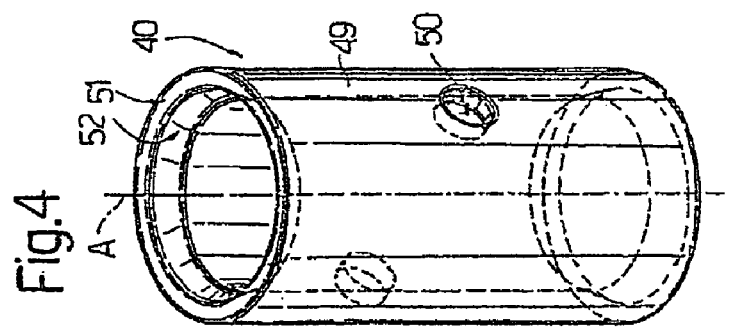
FIG. 4 is a perspective view of a detail of the pump in FIG. 3.

With reference to FIG. 1, a piston pump suitable for receiving fuel from a low pressure pump (not shown) and for compressing the fuel to pressures higher than 2200 bars for feeding the fuel itself to a common rail of an internal combustion engine not shown in the attached figures, is indicated generally by the reference numeral 1.

The pump 1 comprises a pump housing 2 essentially made of a block of metallic material, in which there are made a cylinder (not shown), a feeding channel (not shown) of the fuel to the cylinder, a fuel delivery duct 3; and a check valve 4 arranged along the delivery duct 3.

The delivery duct 3 comprises an inlet bore 5 upstream of the valve 4, and an outlet bore 6 downstream of the valve 4. The valve 4 comprises a chamber 7 that is formed by a cavity in the pump housing 2. Actually, bore 5 and chamber 7 extend in sequence about an axis A, while bore 6 extends radially with respect to axis A and departs from chamber 7. The chamber 7 comprises a bore 8 larger than bore 5 and coaxial to bore 5; a truncated cone face 9 arranged between hole 5 and bore 8; a bore 10, which is larger than bore 8, is coaxial with hole 8 and is arranged on the opposite side of the truncated cone face 9; and a shoulder 41, which is perpendicular to the axis A and is arranged between bore 10 and bore 8. Bore 10 is adjacent to an outer face 12 of the pump housing 2 and is, at least in part, threaded.

The valve 4 comprises in addition to chamber 7, a valve element 13, which in the case in point is a hard material ball;

a biasing and guiding assembly 14 of the ball 13 which in rest position pushes the ball 13 into contact with the truncated cone face 9.

The assembly 14 extends along axis A and comprises a fastening member 16 which in the case in point is a screw; a helical spring 17; and a guiding bushing 18, which is engaged on the fastening member 16, and is adapted to guide the spring 17 and to form a stopper for the ball 13.

The fastening member 16 is formed by a single metallic part of soft material, in particular mild steel, capable of sealing the chamber 7 in fluid-tight manner. With reference to FIG. 1, the fastening member 16 comprises, in sequence from the right leftwards along axis A, a cylindrical body 19 with axis A, partially threaded and adapted to being fastened in bore 10 of the pump housing 2; an essentially cylindrical body 20, which extends in the bore 8 and has a diameter much smaller than the diameter of bore 8 and the diameter of body 19; and an essentially cylindrical further body 21 with axis A, which in turn has a diameter much smaller than the diameter of body 20.

The sequence of bodies 19, 20, 21 having respective progressively decreasing diameters determines in order a shoulder 22 between body 19 and body 20 and a shoulder 23 between body 20 and body 21, while the shoulder 23 also perpendicular to axis A defines a resting surface for the spring 17. The body 20 has an annular protrusion 25 which defines a further shoulder 26 perpendicular to axis A and for the resting of the bushing 18. The body 21 has an annular protrusion 27 for defining a seat 28 comprised between the shoulder 23 and the annular protrusion 27 for anchoring the spring 17 to the fastening member 16.

The helical spring 17 essentially has a constant diameter except for the two end turns 29 which have a diameter smaller than the remaining turns. One of the two end turns 29 is engaged in the seat 28 so as to fasten the spring 17 to the fastening member 16.

Bushing 18 is coaxial to axis A and is essentially defined by a cylindrical tubular wall 30 which has two openings 31 facing and opposite one another in the median position along axis A. In the specific case, the openings 31 are defined by bores.

Each one of the opposite ends of the wall 30 has an outer annular face 32 adapted to engage the shoulder 26 and an inner truncated cone face 33, which substantially defines a chamfering and acts as seat for the ball 13. Between the bushing 18 and the bore 8 there is a cylindrically-shaped free space in which the fuel may freely circulate.

In use, the pump 1 feeds pressurised fuel along the delivery duct 3. When the pressure in the bore 5, following the compression, increases and overcomes the force exerted jointly by the pressure in chamber 7 and in bore 6 on the ball 13 and by the bias of the spring 17, fuel pushes the ball 13 directly against the bushing 18 abuttingly on the truncated cone annular face 33. At the same time, the spring 17 is compressed and the bushing 18 prevents the bending of the spring 17, thus enormously limiting the rotation of the spring 17 about the axis A and, therefore, the wear of the spring 17 and of the fastening member 16. The fuel contained in the bushing 18 following the lifting of the ball 13 is let out through the openings 31 in the space between the bushing 18 and the bore 8 of the chamber 7.

The spring 17 and the bushing 18 have a mirror symmetry with respect to a median plane perpendicular to axis A. This makes it possible to fit the spring 17 and the bushing 18 either in one direction or in the opposite direction, thus enormously simplifying the assembly stages. The assembly stage is further simplified by the fact that assembly 14 may be pre-fitted before inserting the assembly in the seat 7 by engaging one of the end turns 29 in the seat 28 and slightly forcing the bushing 18 about the body 20 against the shoulder 26.

According to the variation shown in FIG. 2, the bushing 18 instead of having bore-shaped openings 31, has openings 34, each of which has the shape of a slot parallel to axis A which departs from one of the ends of the bushing 18 itself.

Figure 3:
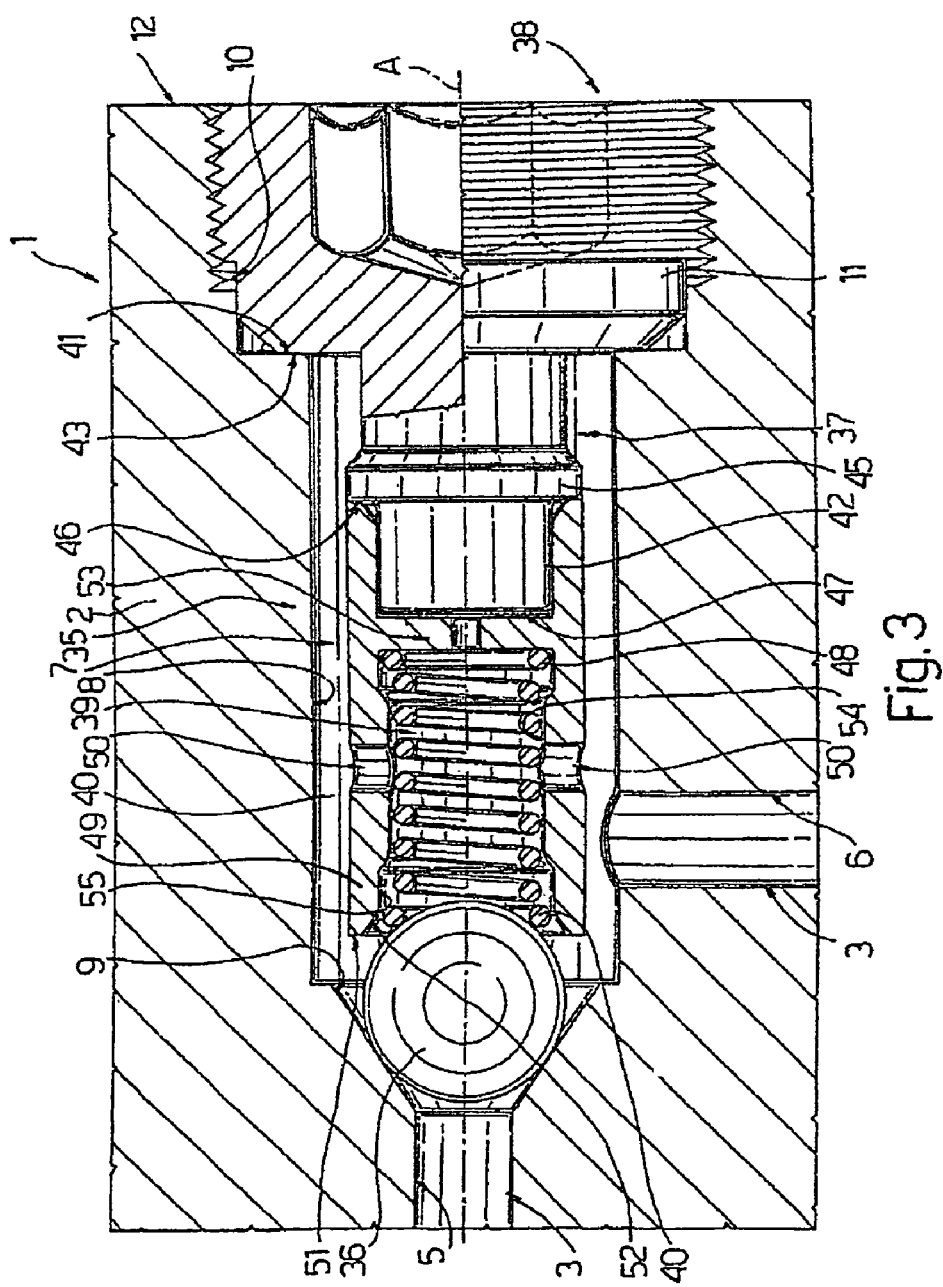
FIG. 3 is a sectional view with parts removed for clarity of a piston pump according to a second embodiment of the present invention.

According to the second embodiment in FIG. 3, the pump 1 has a pump housing 2 identical to that shown in FIG. 1 and for this reason the same reference numbers used in FIG. 1 will be used to indicate identical parts. The pump 1 in FIG. 3 has a check valve 35 which, in addition to chamber 7, has a shutter ball 36 and a biasing and guiding assembly 37 of the ball 36 against the truncated cone face 9.

The assembly 37 extends along axis A and comprises a fastening member 38; a helical spring 39; and a guiding bushing 40, which is engaged on the fastening member 38 and is adapted to guide the spring 39 and to make a seat for the ball 36.

The fastening member 38 is made of soft and malleable material, in particular mild steel, capable of sealing the chamber 7. With reference to FIG. 3, the fastening member 38 comprises, in sequence from the right leftwards along axis A, a partially threaded cylindrical body portion 11 with axis A adapted to being fastened in bore 10 to the pump housing 2; and an essentially cylindrical body portion 42, which extends into bore 8 and has a diameter much smaller than the diameter of bore 8 and the diameter of body portion 11.

Between portions 11 and 42 there is a shoulder 43 which abuts against the shoulder 41. The portion 42 has an annular projection 45 which defines a further shoulder 46 for resting the bushing 40, and its distal end is delimited by a flat circular face 47.

The helical spring 39 essentially has a constant diameter except for the two end turns 48 which have a larger diameter with respect to the constant diameter of the remaining turns.

Bushing 40 is coaxial to axis A and substantially defines a cylindrical wall 49 which has two facing and opposite openings 50 defined by bores. As shown in better detail in FIG. 4, each one of the opposite ends of the wall 49 have an outer annular face 51 adapted to be abuttingly arranged against the shoulder 46 and an inner truncated cone face 52 which essentially defines a chamfering and acts as seat for the ball 36. The bushing 40 further comprises an annular flange-like wall 53 which is arranged within the cylindrical wall 49 and is adapted to being abuttingly arranged against the cylindrical body 42 in contact with the flat cylindrical face 47. Actually, the annular wall 53 acts as a resting surface for the spring 39. With reference to FIG. 3, the bushing 40 has an inner annular cavity 54 at the inner annular wall 53 and an annular cavity 55 flowing into the truncated cone face 52 at the ball 36. The annular cavities 54 and 55 accommodate the end turns 48 of the helical spring 39. In particular, the annular cavity 54 allows to insert one of the end turns 48 of the spring 39 between the annular wall 53 and the annular wall 49 of the bushing 40.

The embodiment in FIG. 3 has the same advantages as the embodiment described with reference to FIG. 1 except for the fact that the bushing 40 does not have mirror symmetry. In addition to these advantages, the bushing 40 is made of particularly hard material, thus preventing accentuated wear of the fastening member 38 because the helical spring 39 is in contact with the annular wall 53 of the bushing 40 instead of the fastening member 38.

Figure 5:
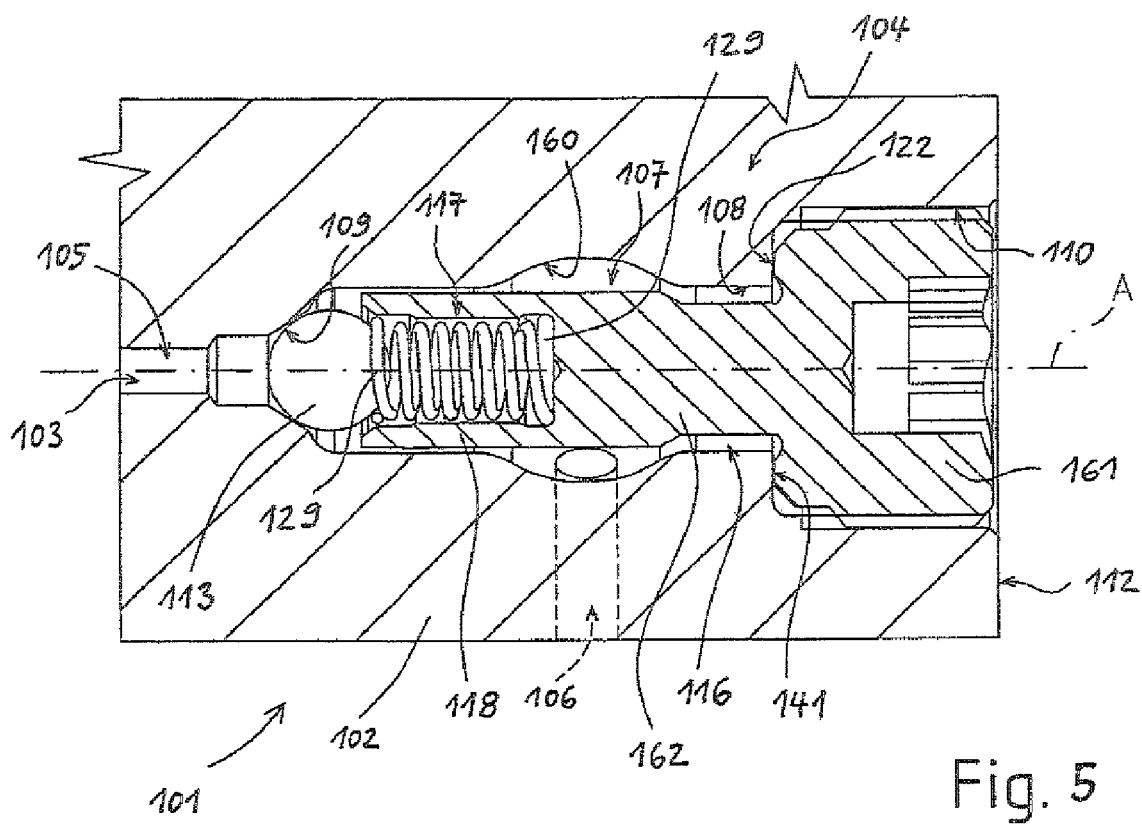
FIG. 5 is a sectional view with parts removed for clarity of a piston pump according to a third embodiment of the present invention.
Figure 6:
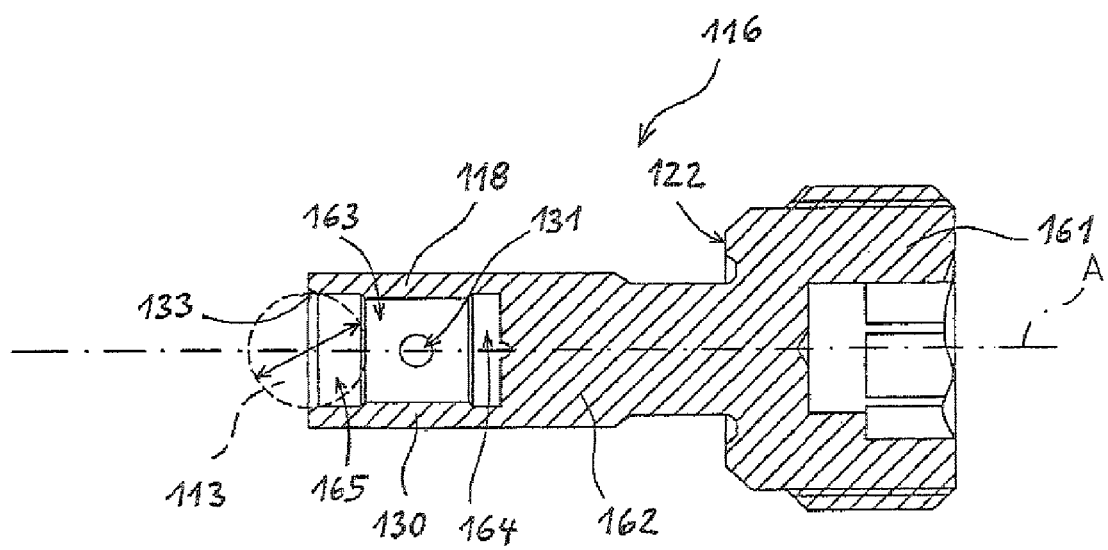
FIG. 6 is a perspective view of a detail of the pump in FIG. 5.

For a third embodiment shown in FIGS. 5 and 6 parts similar to those of the first embodiment have the same reference numbers but 100 added. According to the third embodiment in FIG. 5 the pump 101 comprises a pump housing 102 essentially made of a block of metallic material, in which there are made a cylinder (not shown), a fuel feeding duct (not shown) to the cylinder (not shown), a fuel delivery duct 103; and a delivery valve 104 arranged along the delivery duct 103.

The delivery duct 103 comprises a bore 105 upstream of the valve 104, and a bore 106 downstream of the valve 104. The valve 104 comprises a chamber 107 formed in the pump housing between bores 105 and 106. Bore 105 and chamber 107 extend in sequence about an axis A, while bore 106 extends radially with respect to axis A and departs from chambers 107. Chamber 107 is delimited by a bore 108 larger than bore 105 and coaxial with bore 105; a truncated cone face 109 arranged between bores 105 and 108; a bore 110, which is larger than bore 108, is coaxial with bore 108 and is arranged on the side of bore 108 opposite to the truncated cone face 109; and a shoulder 141, which is perpendicular to axis A and is arranged between bores 110 and 108. Bore 110 is adjacent to an outer face 112 of the pump housing 102 and is threaded at least partially. Chamber 107 is further delimited by an annular vaulted depression 160 along bore 108 at the conjunction of chamber 107 and bore 106.

The valve 104 comprises in addition to chamber 107, a valve member 113 that in the embodiment shown in the figures is a hard material ball; a fastening member 116 and a helical spring 117 compressed between the fastening member 116 and ball 113 for biasing the ball 113 against the truncated cone-shaped surface 109.

Fastening member 116, helical spring 117 and ball 113 are housed in the chamber 107 and are arranged along axis A.

As better shown in FIG. 6, the fastening member 116 comprises a bolt 161 externally threaded, a shank 162 and a bushing 118 for housing and guiding the helical spring 117. Fastening member 116 is made of a single piece of material, preferably of metallic material. In other words, bolt 161, shank 162, and bushing 118 are a single body integrally made from a single piece. Fastening member 116 has an annular shoulder 122, which is arranged perpendicularly to axis A between shank 162 and bolt 161. Bushing 118 is cup-shaped and has a cylindrical wall 130 defining a cavity 163, in which is housed the helical spring 117 and a bottom wall defined by the distal end of shank 162. Cavity 163 enlarges at the bottom wall to form an annular depression 164 in the cylindrical wall 130 and in the proximity of free edge of the bushing 118 to form an annular depression 165 in the cylindrical wall 130. The free edge of the cylindrical wall 130 are internally chamfered to form a resting truncated cone-shaped surface 133 for the ball 113. Cylindrical wall 130 is further provided with two openings 131 (only one shown in FIG. 6) for avoiding that the fuel in the bushing 118 be compressed by the ball 113.

Helical spring 117 comprises a number of turns, which are sweeped in a progressive way with different pitches and have a substantially constant diameter; and two end turns 129 of larger diameter that are housed inside annular depression 164 and 165 respectively. Actually, helical spring 117 is snappingly fitted in the bushing 118 by nesting one of the end turn 129 in annular depression 164.

In use, the pump 101 cyclically feeds pressurised fuel along the delivery duct 103. When the fuel pressure in the bore 105 increases and overcomes the force exerted jointly by the fuel pressure in chamber 107 and in bore 106 on the ball 113 and by the bias of the helical spring 117, fuel pushes the ball 113 directly against the bushing 118 abuttingly on the surface 133. At the same time, the helical spring 117 is compressed and the bushing 118 guides the helical spring 117 and avoids bending of the helical spring 117. It follows that the rotation of the helical spring 117 about the axis A is significantly reduced and, therefore, the wear of the spring 117 and of the fastening member 116 are minimized.

The foregoing relates to a preferred exemplary embodiment of the invention, it being understood that other variants and embodiments thereof are possible within the spirit and scope of the invention, the latter being defined by the appended claims.

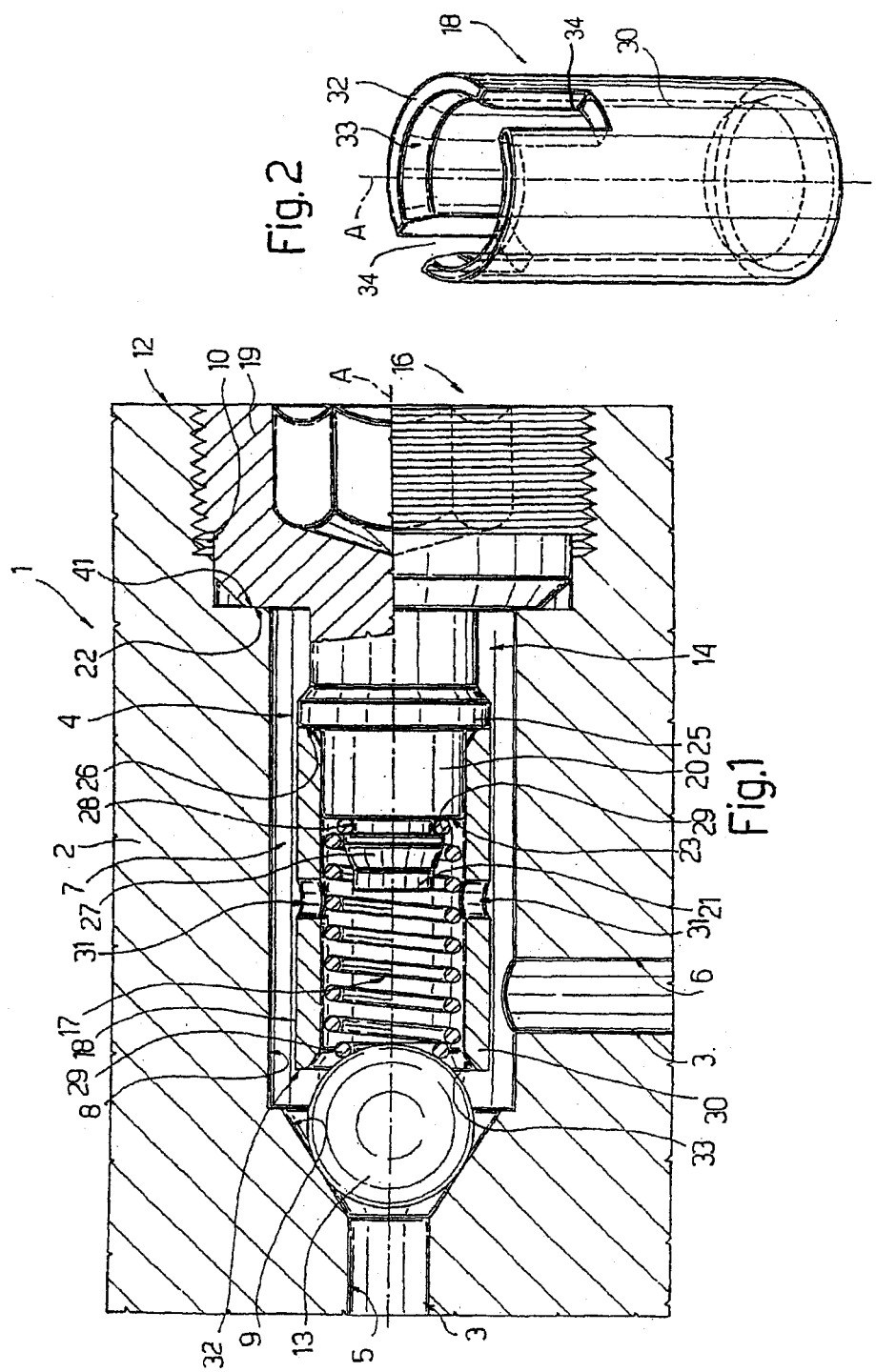

The invention claimed is:

1. A high-pressure pump for feeding fuel to an internal combustion engine; the pump comprising:
   a pump housing; a fuel delivery duct; and a check valve, which extends along a longitudinal axis, is arranged along the delivery duct, and comprises a fuel chamber; a valve ball mobile within the fuel chamber; and a fastening member suitable for being fastened to the pump housing and sealing the chamber in a fluid-tight manner; a helical spring biasing the valve ball; and a bushing arranged about the helical spring in the fuel chamber in order to prevent bending of the helical spring, wherein the fastening member, the helical spring and the bushing can be assembled together so as to form a biasing and guiding assembly before inserting the biasing and guiding assembly in the fuel chamber, wherein the fastening member is fastened to the pump housing and comprises a first threaded cylindrical body portion and a second cylindrical body portion on which the bushing is fitted, wherein the fastening member comprises a third cylindrical body portion comprising a seat for fastening the helical spring, wherein the third cylindrical body portion has an annular protrusion, and wherein the helical spring comprises two end turns arranged respectively on the opposite ends of the helical spring, which end turns have a diameter that is smaller than the essentially constant diameter of the remaining turns, whereby one end turn is adapted to flex outwardly and then snappingly engage with the annular protrusion of the third cylindrical body portion so as to hold the spring to the third cylindrical body portion before insertion into the fuel chamber, and whereby the other end turn engages the valve ball, wherein the first threaded cylindrical body portion, the second cylindrical body portion and the third cylindrical body portion are formed integrally as a single element of structure.

2. A pump according to claim 1:
   wherein the bushing comprises a face adapted to limit the stroke of the ball during the opening stroke of the check valve.

3. A pump according to claim 1:
   wherein the bushing comprises a cylindrical wall in which at least one opening is arranged.

4. A pump according to claim 1:
   wherein the bushing is arranged in the fuel chamber and is surrounded by a free space through which fuel flows.

5. A pump according to claim 1:
   wherein the bushing comprises an inner wall essentially perpendicular to the longitudinal axis and adapted to define a resting surface of one of the ends of the spring.

6. A pump according to claim 3:
   wherein the inner wall has an annular shape.

7. A pump according to claim 3:
   wherein the helical spring and the bushing are made of materials having essentially the same hardness.

8. A high-pressure pump for feeding fuel to an internal combustion engine; the pump comprising:
   a pump housing; a fuel delivery duct; and a check valve, which extends along a longitudinal axis, is arranged along the delivery duct, and comprises a fuel chamber; a valve ball mobile within the fuel chamber; and a fastening member suitable for being fastened to the pump housing and sealing the chamber in a fluid-tight manner; a helical spring biasing the valve ball; and a bushing arranged about the helical spring in the fuel chamber in order to prevent bending of the helical spring, wherein the fastening member, the helical spring and the bushing can be assembled together so as to form a biasing and guiding assembly before inserting the biasing and guiding assembly in the fuel chamber, wherein the fastening member is fastened to the pump housing and comprises a first threaded cylindrical body portion and a second cylindrical body portion on which the bushing is fitted, wherein the fastening member comprises a third cylindrical body portion which includes an annular projection which defines a shoulder which faces toward the valve ball, which shoulder the bushing rests against, and wherein the bushing has an inner annular cavity adapted to fasten the helical spring to the bushing, wherein said helical spring has two end turns arranged respectively on the opposite ends of the helical spring, each having a diameter which is larger than the essentially constant diameter of the remaining turns; one end turn being adapted to flex inwardly and be snappingly engaged in the annular cavity of the bushing and thus hold the helical spring to the bushing before insertion into the fuel chamber, and the other end turn engages the valve ball.

9. A pump according to claim 8:
wherein said bushing and said fastening member are formed integrally as a single body.

10. A pump according to claim 9:
wherein the fastening member comprises a bolt to be screwed in the pump housing, and the bushing, said bolt and said bushing being formed integrally as a single body.

11. A pump according to claim 10:
wherein the fastening member comprises a shank arranged between the bolt and the bushing, said bolt, said shank and said bushing being formed integrally as a single body.

12. A pump according to claim 9:
wherein the bushing and the helical spring can be snappingly fitted to one another before inserting them in the seat.

13. A pump according to claim 10:
wherein the bushing and the helical spring can be snappingly fitted to one another before inserting them in the seat.

14. A high-pressure pump for feeding fuel to an internal combustion engine; the pump comprising:
a pump housing; a fuel delivery duct; and a check valve, which extends along a longitudinal axis, is arranged along the delivery duct, and comprises a fuel chamber; a valve ball mobile within the fuel chamber; and a fastening member suitable for being fastened to the pump housing and sealing the chamber in a fluid-tight manner; a helical spring biasing the valve ball; and a bushing arranged about the helical spring in the fuel chamber in order to prevent bending of the helical spring, wherein said bushing is an integral part of said fastening member, wherein the fastening member comprises a bolt to be screwed in the pump housing and a shank arranged between the bolt and the bushing, said bolt, said shank and said bushing being formed integrally as a single body, wherein the helical spring includes two end turns which are arranged respectively on the opposite ends of the helical spring and have a diameter which is larger than the substantially constant diameter of the remaining turns, wherein the bushing is cup shaped and includes an annular cavity at the base of the cup, and wherein one of the two end turns of the helical spring can be flexed inwardly so as to snappingly fit into the annular cavity and thus hold the helical spring to the bushing before insertion in the seat, and the other of the two end turns engages the valve ball.

15. A high-pressure pump according to claim 14:
wherein the fastening member, the helical spring and the bushing can be assembled together so as to form a biasing and guiding assembly before inserting the biasing and guiding assembly in the fuel chamber.

16. A pump according to claim 15:
wherein the fastening member is fastened to the pump housing and comprises a first threaded cylindrical body portion and a second cylindrical body portion on which the bushing is fitted.

17. A pump according to claim 16:
wherein the fastening member comprises a third cylindrical body portion comprising a seat for fastening the helical spring.

* * * * *

UNITED STATES PATENT AND TRADEMARK OFFICE
CERTIFICATE OF CORRECTION

| | |
|---|---|
| PATENT NO. | : 7,871,251 B2 |
| APPLICATION NO. | : 12/096525 |
| DATED | : January 18, 2011 |
| INVENTOR(S) | : Giuseppe Marino et al. |

It is certified that error appears in the above-identified patent and that said Letters Patent is hereby corrected as shown below:

Delete Fig. 2 and replace with the attached Fig. 2.
- Reference Number 34 (two occurrences) in Figure 2 of the Replacement Sheet has not been added.

Signed and Sealed this
Twenty-sixth Day of July, 2011

David J. Kappos
*Director of the United States Patent and Trademark Office*